United States Patent [19]
Chiarelli

[11] 3,905,388
[45] Sept. 16, 1975

[54] PIPE TAPPING TOOL
[76] Inventor: Carl Chiarelli, 20 Lake End Rd., Merrick, N.Y. 11566
[22] Filed: July 25, 1973
[21] Appl. No.: 382,367

[52] U.S. Cl. ............................................. 137/318
[51] Int. Cl.² ..................... B23B 41/08; F16L 41/06
[58] Field of Search ..................... 137/315, 317, 318; 285/197; 408/72

[56] References Cited
UNITED STATES PATENTS

| | | | |
|---|---|---|---|
| 174,542 | 3/1876 | Letzkus........................... | 137/318 X |
| 511,327 | 12/1893 | Eley................................. | 137/318 |
| 1,039,827 | 10/1912 | Sharp............................... | 137/318 |
| 2,899,983 | 8/1959 | Farris.............................. | 137/318 X |
| 3,355,794 | 12/1967 | Adams............................. | 285/197 X |
| 3,401,957 | 9/1968 | McCright et al................... | 285/197 |
| 3,735,775 | 5/1973 | Tickett.............................. | 137/318 |

*Primary Examiner*—Martin P. Schwadron
*Assistant Examiner*—Richard Gerard
*Attorney, Agent, or Firm*—Edwin E. Greigg

[57] ABSTRACT

An arrangement for facilitating the act of connecting a service line to a flowing main line in the form of a pipe tapping device which includes saddle-shaped members for attachment to the main line, at least one of the members including an integral threaded nipple to which a threaded valve assembly may be secured, and a sleeve structure including a cutting tool which is permitted to bypass the valve during the piercing operation and then to be withdrawn for subsequent use.

2 Claims, 4 Drawing Figures

PIPE TAPPING TOOL

BACKGROUND OF THE INVENTION

This invention relates to improvements in devices for providing outlets in pipe lines adapted to carry liquid or fluid and more particularly to an apparatus that may be used by the occupant of a house for tapping pipe lines without requiring a plumber.

Pipe tapping devices of this general type are known, e.g., the patent to Ehrens et al., U.S. Pat. No. 3,495,615 discloses a device for attachment to a pipe that includes a pipe tap valve 10 that has an integral fluid outlet passageway 28 mounted normal thereto. A pipe cutting device is positioned in permanent relation in the valve body 10. A structure of the type disclosed by Ehrens et al is too costly for the use intended by the present applicant.

In the Powell, Jr. U.S. Pat. No. 3,104,456 there is also disclosed a method of connecting service lines to mains, and in the drawings there is shown a tool 24 which may be fastened to the pipe 20 which is to be later perforated, as also shown in the drawings, the tool 24 which is hollow, is strapped to the pipe in the manner illustrated. Valve 36 is open to permit entry of the cutting tool for piercing and threading of the pipe. Thereafter the valve 36 is closed, the tool is withdrawn and a pipe is inserted into the tool 24 and threaded into engagement with the pipe 20. Such an arrangement as proposed by Powell, Jr. thus requires, as a final step to the method, the telescoping of pipe 54 which has been threaded into the pipe 20 with a supplemental service line which is later welded at 60 to the pipe 20.

Bates discloses in his U.S. Pat. No. 3,396,745 a saddle adapted to be secured to a pipe for subsequent penetration of the pipe to which it is attached, however, in this instance, the service line is secured to the main by means of detonating an opening into the wall of the pipe such as shown in FIG. 3 of the patent.

OBJECTS AND SUMMARY OF THE INVENTION

Accordingly, the principal object of this invention is to provide a pipe tapping device of simplified construction that may be used by an unskilled person to provide an opening in either a pipe line that is then carrying a liquid or fluid or a pipe line that is free of any flowing medium.

Another object of this invention is to provide pipe tapping assembly that may be suitably packaged and sold in a hardware store.

Still another object of this invention is to provide a device for tapping either one or two pipe line extensions on a single existing pipe line.

Yet another object of this invention is to provide a liquid-proof permanent seal between the pipe tapping device and the pipe line to which it is attached.

Accordingly, this type tapping device comprises a sectional saddle-shaped means arranged to surround the outer wall of the section of pipe, means being provided to clamp said sectional means in liquid-proof engagement with said section of pipe, there being included a laterally extending threaded first nipple means formed integrally with one of said sectional means which is arranged to surround said pipe, threaded sleeve means also adapted to be secured to said nipple, said sleeve means further associated at one end with a bushing means and including an axially extending shank means supported in the bushing means and having an outer free end which includes a drivable portion and an inner end which includes a cutting bit portion, fixed guide means being interposed between said bushing and said threaded portion, and travel limiting means for said cutting bit portion to prevent damage to the interior wall of the pipe opposite from the portion that is apertured.

The invention will be better understood and further objects and advantages will become more apparent from a reading of the following specification taken in conjunction with the drawings.

DESCRIPTION AND OPERATION OF THE EMBODIMENTS

Figure 1:
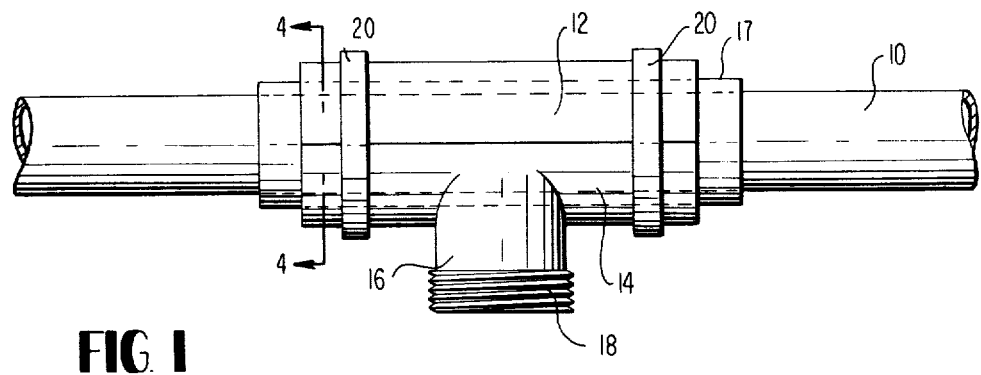
FIG. 1 is a horizontal elevational view of the saddle members that form one component of the invention.

Turning now to the drawings, and more particularly to FIG. 1, there is indicated at 10 a main pipe line from which additional service of liquid or fluid is sought. Accordingly, a sectional saddle-shaped member comprising a semicircular body 12 is positively secured to another semicircular body 14 that includes an integral first nipple means 16 that is exteriorly threaded as shown at 18.

The saddle-shaped members are secured to the pipe 10 by suitable clamp members 20—20, each of which is arranged to straddle the nipple means 16, as shown. Prior to clamping the saddle-shaped members around the pipe a pliable non-rotting, split plastic tubing 17 having an inside diameter of the same size as that of the outside diameter of the pipe 10 from which service is to be secured, is positioned between the saddle-shaped members and the pipe.

Figure 4:
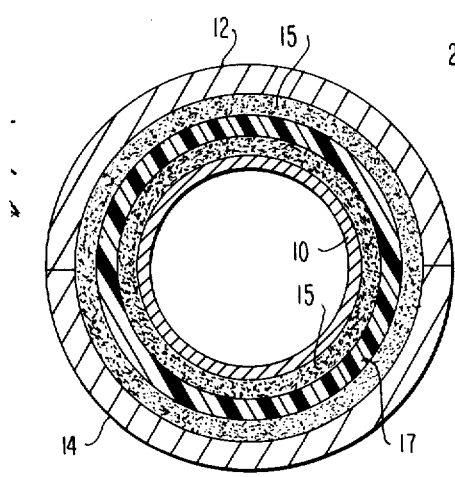
FIG. 4 is a cross-sectional view taken along line 4—4 of FIG. 1 and illustrates the waterproof cement used in assembly with the plastic tube and the saddle members. The cement is shown somewhat exaggerated for purposes of illustration.

As shown in the drawing, the plastic tubing 17 projects beyond the lateral edges of the saddle members to provide a positive seal between the saddle members and the exterior wall of the pipe. It is preferable when assembling the plastic tubing 17 relative to the pipe 10, that the seam thereof be assembled on the pipe at a position of approximately 180° from the area to be penetrated by the cutting tool to further assure against possible leakage. Also, it is optional to apply a waterproof cement to one or both sides of the plastic tubing 17 before assembling the saddle members thereover preparatory to drilling the opening in the pipe. Alternatively, the cement 15 could be placed on the inside surface of the plastic tubing 17 and to the inside surface of the saddle members (FIG. 4).

The saddle-shaped members 12 and 14 may be made of brass with the inner wall thereof provided with serrations which when the members are securely fastened about the pipe 10 will bite through the plastic tubing and into the exterior wall of the pipe 10.

Figure 2:
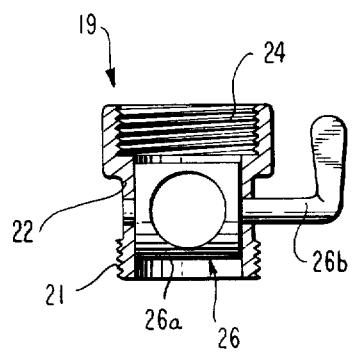
FIG. 2 is an elevational view partially in cross section of a valve member that is assemblable with the component illustrated in FIG. 1.

Reference is now made to the structure shown in FIG. 2 where there is illustrated a second nipple means 19 including a short section of pipe 22 which is provided at one end with a threaded interior portion 24 that is arranged to be secured to the threaded nipple 16. The threaded portion 24 forms a second nipple means. The opposite end of said section of pipe is provided with an exteriorly threaded portion 21 for a purpose to be described later. The threaded portion 21 forms a third nipple means.

Substantially medially of the interior of said section of pipe 22 there is provided any suitable type of manually manipulable valving means 26 which when in an open condition can be utilized to control the divergent flow from the main line 10 to any source by means of a hose, etc., which is threadedly secured to the short section of pipe 22. The valve means 16 preferably includes a rotatably mounted aperture cylinder 26a and a handle 26b.

This short section of pipe together with its valving means 26 serves a dual function, i.e., when a main line 10, which is to be tapped, has a fluid flow therein which cannot be interrupted for a sufficient period of time to make the tap in the line, as explained earlier herein, then this valving means 26 is fastened to the nipple 16 prior to assembly therewith of the cutting tool so that the main line can be tapped.

In those instances where flow can be interrupted through the main line 10 for a sufficient duration to make the tap therein, then the valving means may be dispensed with while the tapping operation takes place as will now be described.

Figure 3:
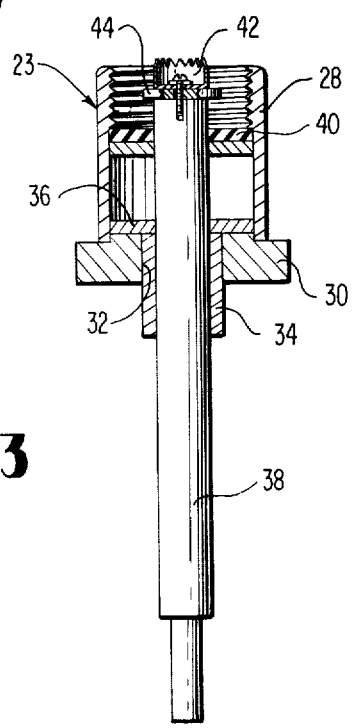
FIG. 3 is an elevational view also partially in cross section of a pipe cutting implement for cooperation with the components shown in FIGS. 1 and 2.

The pipe cutting assembly which is shown in cross section in FIG. 3 includes sleeve means 23 having an interiorly threaded portion of pipe 28 of suitable wall thickness which is seated in an axially apertured plug member 30, a fixed self-lubricated bushing 34, which is positioned in an aperture 32 of the plug member 30, and guide means 36 for a drill shank 38 which extends therethrough. The threaded portion 28 forms a fourth nipple means.

As illustrated, the guide means 36 is in juxtaposition with the bushing 34 and together with the replaceable liquid-tight axially apertured sealing gasket 40, which is positioned adjacent to the interiorly threaded portion of the pipe 28, serves to properly align the drill shank 38 and the cutting tool 42 carried by the inner end thereof with the bore in the nipple 16.

It will be observed that the inner end of the cutting tool 42 is provided with a stop washer means 44 of greater circumference than the bit of the cutting tool so that as soon as the cutting operation has achieved penetration of the wall of the pipe 10, the forward motion of the cutter is stopped thereby preventing the piercing of the rear wall of the pipe.

It is further contemplated to be within the concept of this disclosure where it is required to have both sides of the line 10 penetrated thus providing two oppositely disposed divergent sources of flow from the main pipe line 10, that each of the saddle-shaped members be provided with nipples, as shown in FIG. 1 at 16. Accordingly, when the cutting operation is to be begun, the stop member 44 is removed from its position adjacent to the cutting bit and then the drill shank which is supported in the chuck of an electric motor is secured to the end of the shank to begin the cutting operation.

The aperture in the cylinder 26a is sufficiently large so that the cutting tool 42, the washer means 44 and the drill shank 38 can pass therethrough when the main line 10 is to be tapped in conjunction with the valve assembly 19.

In view of the foregoing it is believed that the operation will be now apparent.

Depending upon the condition of the pipe line 10, that is if there is a fluid flow therein, one installs the saddle-shaped clamps on the pipe line in a suitable location for the secondary flow line, then secures the short section of pipe 22 containing the valving means to the nipple and thereafter threadedly attaches the cutting assembly thereto preparatory for the final piercing operation.

In the event there is no fluid flow in the pipe line 10 then the valving means can be dispensed with, and the cutting tool mechanism simply attached to the nipple and the cutting operation is performed as explained earlier. Naturally, it is to be understood that once the cutting operation is performed and the cutting tool removed, the valving means can be installed and the manually manipulable valve thereof positively seated to prevent leakage, or the nipple can be provided with a suitable threaded cap member where it is known that the main pipe line will not contain fluid flow for a lengthy period of time.

In conclusion, it will be understood that the fitting shown in FIG. 2 may be a commercially available gate valve with the appropriate male and female threads, and, further, that all threaded nipples and fittings are of standard sizes and thread, normally used in plumbing.

What is claimed is:

1. A pipe tapping device comprising, in combination:
   a. a sectional saddle-shaped member arranged to surround the outer wall of a length of pipe comprising a pair of semicircular bodies with at least one of said bodies having laterally extending threaded first nipple means formed integrally therewith;
   b. a split pliable extent of plastic material interposed between the sectional saddle-shaped member and the pipe, said plastic material having a waterproof cement applied to at least one side thereof;
   c. at least two clamp members for clamping the sectional saddle-shaped member with the plastic material in liquid-proof engagement with the pipe;
   d. a control valve comprising a generally cylindrical body having screw threads formed at its two ends defining thereby second and third nipple means, a rotatably mounted apertured valve cylinder between the two ends and handle means extending from the valve cylinder and outwardly of said generally cylindrical body for rotating the valve cylinder between an open and closed position;
   e. a drill shank having an outer free end including a drivable portion and a cutting bit mounting end;
   f. a cutting bit;
   g. travel limiting means to prevent damage to the interior wall of the pipe opposite from the portion that is apertured when the tapping operation is conducted;
   h. means mounting the cutting bit and the travel limiting means to the cutting bit mounting end such that both the cutting bit and the travel limiting means are removable from the drill shank; and i. sleeve means comprising a generally cylindrical body having screw threads formed at one end thereof defining thereby a fourth nipple means, an axially apertured plug, bushing means, guide means and replaceable sealing means, wherein:

said plug, bushing means and guide means are assembled and mounted at the other end of the generally cylindrical body of said sleeve means, said replaceable sealing means is mounted within the generally cylindrical body of said sleeve means between the fourth nipple means and the assembled plug, bushing means and guide means, said bushing means, guide means and sealing means when assembled with the cylindrical body of said sleeve means providing a succession of aligned apertures through which the drill shank passes for sealing and guiding same, said drill shank when so arranged being capable of both rotational and longitudinal displacement relative to the cylindrical body of said sleeve means and the bushing means, the guide means and the sealing means, said second nipple means engages said first nipple means and said fourth nipple means engages said third nipple means during the pipe tapping operation, and the aperture of the valve cylinder is so dimensioned that said drill shank, said cutting bit and said travel limiting means can pass therethrough during the pipe tapping operation.

2. A pipe tapping device as claimed in claim 1, wherein in assembly a portion of the plastic material extends beyond the lateral edges of the sectional saddle-shaped member.

* * * * *